(12) United States Patent
Pidathala et al.

(10) Patent No.: US 10,505,956 B1
(45) Date of Patent: *Dec. 10, 2019

(54) SYSTEM AND METHOD FOR DETECTING MALICIOUS LINKS IN ELECTRONIC MESSAGES

(71) Applicant: FireEye, Inc., Milpitas, CA (US)

(72) Inventors: Vinay Pidathala, San Jose, CA (US); Henry Uyeno, Sunnyvale, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,128

(22) Filed: Feb. 5, 2018

Related U.S. Application Data

(63) Continuation of application No. 15/083,171, filed on Mar. 28, 2016, now Pat. No. 9,888,019, which is a continuation of application No. 13/945,394, filed on Jul. 18, 2013, now Pat. No. 9,300,686.

(51) Int. Cl.
*H04L 29/06* (2006.01)

(52) U.S. Cl.
CPC ........ *H04L 63/1416* (2013.01); *H04L 63/145* (2013.01); *H04L 63/1433* (2013.01)

(58) Field of Classification Search
CPC ....................... H04L 63/1416; H04L 63/1433; H04L 63/145
USPC .......................................................... 726/22
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Jason K Gee
*Assistant Examiner* — Angela R Holmes
(74) *Attorney, Agent, or Firm* — Rutan & Tucker, LLP

(57) ABSTRACT

According to one embodiment, in response to receiving a plurality of uniform resource locator (URL) links for malicious determination, any known URL links are removed from the URL links based on a list of known link signatures. For each of remaining URL links that are unknown, a link analysis is performed on the URL link based on link heuristics to determine whether the URL link is suspicious. For each of the suspicious URL links, a dynamic analysis is performed on a resource of the suspicious URL link. It is classified whether the suspicious URL link is a malicious link based on a behavior of the resource during the dynamic analysis.

41 Claims, 7 Drawing Sheets

(56) References Cited

U.S. PATENT DOCUMENTS

| | | |
|---|---|---|
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sårhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,017,185 B1 | 3/2006 | Wiley et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,225,188 B1 | 5/2007 | Gai et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,437,764 B1 | 10/2008 | Sobel et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,571,221 B2 | 8/2009 | Rao et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |

(56) References Cited

U.S. PATENT DOCUMENTS

| | | |
|---|---|---|
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Kue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B1 | 11/2016 | Ismael et al. |
| 9,516,057 B2 | 12/2016 | Aziz |
| 9,519,782 B2 | 12/2016 | Aziz et al. |
| 9,535,727 B1 | 1/2017 | Jerbi et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Dtvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Idathala et al. |
| 9,910,988 B1 | 3/2018 | Vincent et al. |
| 9,912,644 B2 | 3/2018 | Cunningham |
| 9,912,681 B1 | 3/2018 | Ismael |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |

(56) References Cited

U.S. PATENT DOCUMENTS

| | | |
|---|---|---|
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Shame et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0172305 A1 | 9/2003 | Aiwa |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0202099 A1 | 10/2003 | Nakamura et al. |
| 2003/0212902 A1 | 11/2003 | van der Made |
| 2003/0217283 A1 | 11/2003 | Rastar et al. |
| 2003/0221095 A1 | 11/2003 | Gaunt et al. |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0064737 A1 | 4/2004 | Milliken et al. |
| 2004/0083408 A1 | 4/2004 | Spiegel et al. |
| 2004/0088581 A1 | 5/2004 | Brawn |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0039042 A1 | 2/2005 | Liang |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0273856 A1 | 12/2005 | Huddleston |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber |
| 2006/0179147 A1 | 8/2006 | Tran et al. |
| 2006/0184632 A1 | 8/2006 | Marino et al. |
| 2006/0185014 A1 | 8/2006 | Spatscheck et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |

(56) References Cited

U.S. PATENT DOCUMENTS

| | | |
|---|---|---|
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner |
| 2007/0171824 A1 | 7/2007 | Ruello |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0234409 A1 | 10/2007 | Eisen |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler |
| 2008/0028463 A1 | 1/2008 | Dagon |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0097942 A1 | 4/2008 | Zhao |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko |
| 2009/0064332 A1 | 3/2009 | Porras |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0234904 A1 | 9/2009 | Dalgliesh et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0035784 A1 | 2/2011 | Jakobsson |
| 2011/0040756 A1 | 2/2011 | Jones et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |

(56) References Cited

U.S. PATENT DOCUMENTS

| | | | |
|---|---|---|---|
| 2011/0307955 A1 | 12/2011 | Kaplan et al. |
| 2011/0307956 A1 | 12/2011 | Yermakov et al. |
| 2011/0314546 A1* | 12/2011 | Aziz ................ G06F 21/56 726/24 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0158626 A1 | 6/2012 | Zhu et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallarn |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1 | 11/2012 | Xie et al. |
| 2012/0317642 A1 | 12/2012 | Royal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031600 A1 | 1/2013 | Luna et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1* | 4/2013 | Balupari ............ G06F 21/552 726/22 |
| 2013/0097706 A1 | 4/2013 | Titonis |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Staffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0095717 A1 | 4/2014 | Danforth et al. |
| 2014/0130158 A1 | 5/2014 | Wang et al. |
| 2014/0130161 A1 | 5/2014 | Golovanov |
| 2014/0137180 A1 | 5/2014 | Lukacs et al. |
| 2014/0169762 A1 | 6/2014 | Ryu |
| 2014/0173739 A1 | 6/2014 | Ahuja et al. |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0365640 A1 | 12/2014 | Wohl et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006755 A1 | 1/2016 | Donnelly et al. |
| 2016/0006756 A1 | 1/2016 | Ismael et al. |
| 2016/0026506 A1 | 1/2016 | Jiang |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/06928 A2 | 1/2002 |
| WO | 02/23805 A2 | 1/2002 |
| WO | 0206928 A2 | 1/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |
| WO | 2015/009411 A1 | 1/2015 |

OTHER PUBLICATIONS

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://

(56) References Cited

OTHER PUBLICATIONS www.altavista.com/web/results?Itag=ody&pg=aq&aqmode=aqa=Event+Orch-esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware letection." Computational intelligence and Security (CIS), 2011 Seventh International Conference on. IEEE, 2011.
Kaeo, Merike , "Designing Network Security", ("Kaeo"), (Nov. 2003).
Ke-Wei Su; et al; "Suspicious URL Filtering Based on Logistic Regression with Multi-view Analysis"; Information Security (Asia JCIS), 2013 Eighth Asia Joint Conference on Year: 2013 pp. 77-84.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kemel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Vlalware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).

(56) References Cited

OTHER PUBLICATIONS

NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS'05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Dberheide et al., CloudAV.sub.--N-Version Antivirus in the Network Cloud, 17th USENIX Security Symposium USENIX Security '08 Jul. 28-Aug. 1, 2008 San Jose, CA.
PCT/US2014/043724 tiled Jun. 23, 2014 International Search Report and Written Opinion dated Oct. 31, 2014.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
Thuraisingham, Bhavani; "Data Mining for Malicious Code Detection and Security Applications"; Web Intelligence and Intelligent Agent Technologies, 2009. WI-IAT '09. IEEE/WIC/ACM International Joint Conferences on Year: 2009, vol. 1 pp. 6-7.
U.S. Appl. No. 11/151,812, filed Jun. 13, 2005 Final Office Action dated Aug. 29, 2011.
U.S. Appl. No. 11/151,812, filed Jun. 13, 2005 Final Office Action dated Nov. 25, 2009.
U.S. Appl. No. 11/151,812, filed Jun. 13, 2005 Non-Final Office Action dated Apr. 2, 2009.
U.S. Appl. No. 11/151,812, filed Jun. 13, 2005 Non-Final Office Action dated Mar. 30, 2011.
U.S. Appl. No. 11/151,812, filed Jun. 13, 2005 Non-Final Office Action dated Oct. 25, 2010.
U.S. Appl. No. 13/945,394, filed Jul. 18, 2013 Non-Final Office Action dated Mar. 10, 2015.
U.S. Appl. No. 13/945,394, filed Jul. 18, 2013 Notice of Allowance dated Jan. 6, 2016.
U.S. Appl. No. 13/945,394, filed Jul. 18, 2013 Notice of Allowance dated Sep. 25, 2015.
U.S. Appl. No. 14/042,482, filed Sep. 30, 2013 Advisory Action dated Sep. 2, 2015.
U.S. Appl. No. 14/042,482, filed Sep. 30, 2013 Final Office Action dated Feb. 3, 2015.
U.S. Appl. No. 14/042,482, filed Sep. 30, 2013 Non-Final Office Action dated Jul. 16, 2014.
U.S. Appl. No. 14/042,482, filed Sep. 30, 2013 Non-Final Office Action dated Nov. 23, 2015.
U.S. Appl. No. 14/316,714, filed Jun. 26, 2014 Non-Final Office Action dated Aug. 13, 2015.
U.S. Appl. No. 14/316,714, filed Jun. 26, 2014 Notice of Allowance dated Apr. 4, 2016.
U.S. Appl. No. 14/316,714, filed Jun. 26, 2014 Notice of Allowance dated Mar. 23, 2016.
U.S. Appl. No. 15/083,171, filed Mar. 28, 2016 Final Office Action dated May 19, 2017.
U.S. Appl. No. 15/083,171, filed Mar. 28, 2016 Non-Final Office Action dated Oct. 25, 2016.
U.S. Appl. No. 15/083,171, filed Mar. 28, 2016 Notice of Allowance dated Sep. 22, 2017.
U.S. Appl. No. 15/213,306, filed Jul. 18, 2016 Notice of Allowance dated Jan. 11, 2017.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
U.S. Appl. No. 13/089,191, filed Apr. 18, 2011 Non-Final Office Action dated Feb. 13, 2013.
U.S. Appl. No. 13/089,191, filed Apr. 18, 2011 Notice of Allowance dated Jul. 29, 2013.
U.S. Appl. No. 14/745,903, filed Jun. 22, 2015 Final Office Action dated Mar. 27, 2017.
U.S. Appl. No. 14/745,903, filed Jun. 22, 2015 Non-Final Office Action dated Oct. 12, 2016.
U.S. Appl. No. 14/745,903, filed Jun. 22, 2015 Notice of Allowance dated Jul. 24, 2017.
"Mining Specification of Malicious Behavior"—Jha et al, UCSB, Sep. 2007 https://www.cs.ucsb.edu/.about.chris/research/doc/esec07.sub.--mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 11/151,812, filed Jun. 13, 2005 Notice of Allowance dated Aug. 14, 2013.
U.S. Appl. No. 14/042,482, filed Sep. 30, 2013 Final Office Action dated Jul. 11, 2016.
U.S. Appl. No. 14/042,482, filed Sep. 30, 2013 Non-Final Office Action dated Jan. 5, 2017.
U.S. Appl. No. 14/042,482, filed Sep. 30, 2013 Notice of Allowance dated Jul. 28, 2017.
U.S. Appl. No. 15/600,320, filed May 19, 2017 Notice of Allowance dated Aug. 16, 2017.
U.S. Appl. No. 15/831,308, filed Dec. 4, 2017 Non-Final Office Action dated May 14, 2019.

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

EP 14741730.7 filed Feb. 17, 2016 Office Action dated Apr. 18, 2019.

* cited by examiner

SYSTEM AND METHOD FOR DETECTING MALICIOUS LINKS IN ELECTRONIC MESSAGES

RELATED APPLICATIONS

This application is a continuation of U.S. patent application Ser. No. 15/083,171 filed Mar. 28, 2016, now U.S. Pat. No. 9,888,019 issued Feb. 6, 2018, which is a continuation of U.S. patent application Ser. No. 13/945,394 filed on Jul. 18, 2013, now U.S. Pat. No. 9,300,686 issued Mar. 29, 2016, the entire contents of which are incorporated by reference herein.

FIELD OF THE INVENTION

Embodiments of the present invention relate generally to malware detection. More particularly, embodiments of the invention relate to detecting malicious links in electronic messages.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye®, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Network traffic can be in a variety of forms. One type of network traffic is in a form of emails, where an email may contain an attachment and/or a link such as a universal resource locator (URL) link. An email may or may not be malicious dependent upon whether a link embedded therein is associated with a remotely located malicious resource. There has been a lack of efficient ways for detecting whether a link is malicious.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
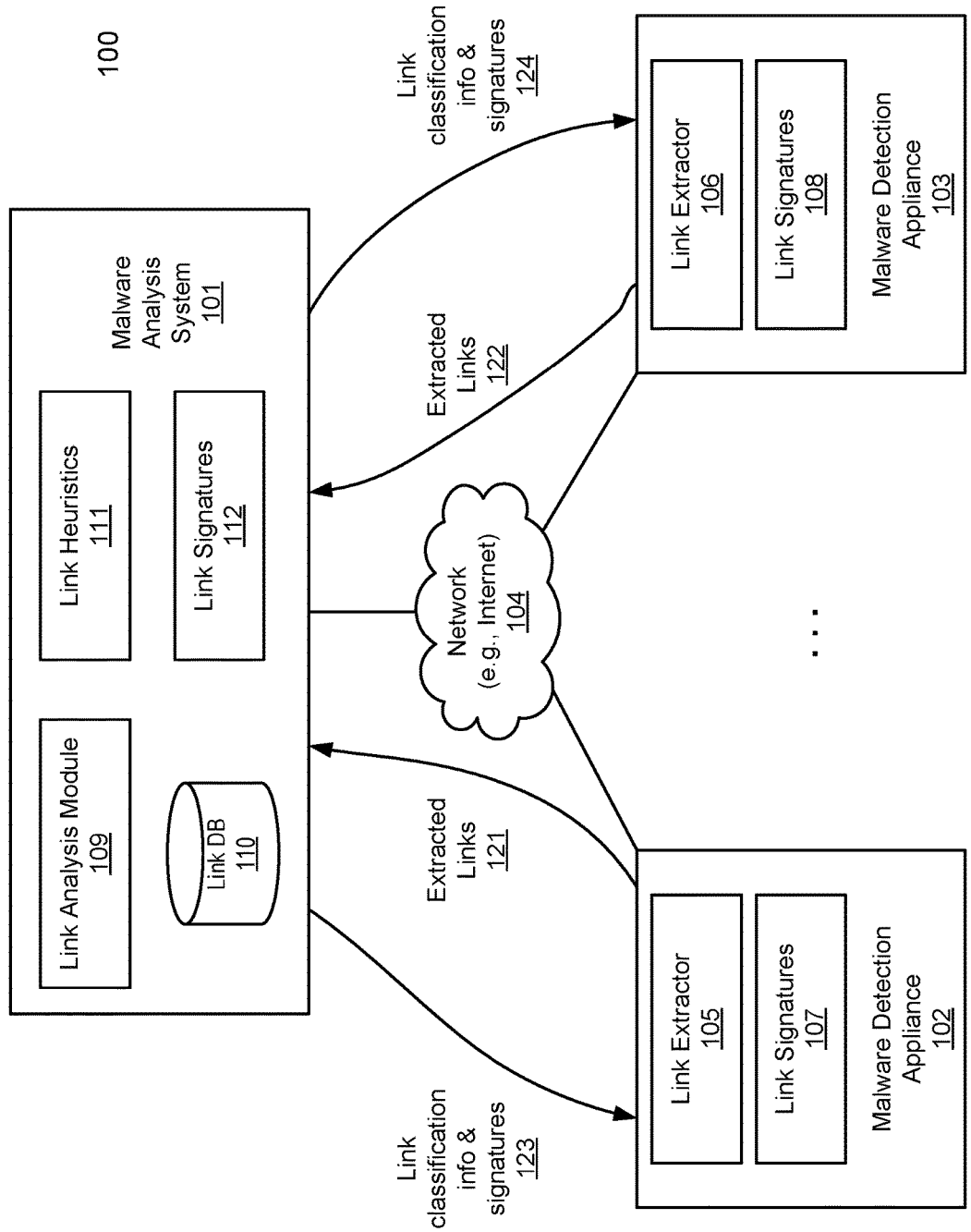
FIG. 1 is a block diagram illustrating a network system for malware detection according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Also, the term "email" generally denotes a communication message being digital data with a particular format such as one or more packet(s), frame(s), or any other series of bits having a prescribed format, which may include, but not limited or restricted to an electronic mail message, an instant message (IM), or another type of communication message.

According to some embodiments, one or more malware detection appliances, such as email malware detection systems, are deployed strategically to capture and detect emails that include a URL link. Each of the malware detection appliances is configured to monitor email traffic and to recognize a URL link within the emails. Once the malware detection appliance detects a URL link, the malware detection appliance extracts the URL link from an email and performs an analysis on the extracted link based on malicious link signatures maintained locally within the malware detection appliance. If it is determined that the extract URL link is considered as malicious in view of the malicious link signatures, malware detection appliance classifies the URL link as a malicious link and may alert an administrator or user accordingly. If the malware detection appliance cannot determine whether the URL link is malicious based on the locally maintained malicious link signatures, it sends the extracted URL link to a remote malware analysis system over a network such as the Internet (also referred to as a dedicated malware analysis system in the cloud). In one embodiment, the malware detection appliance only sends the URL link to the remote malware analysis system without sending the remaining content or any identifying information of the email since such information may be confidential. A malware detection appliance may constantly or periodically send the detected URL links to the malware analysis system(s) in the cloud, which may be implemented as a centralized or distributed malware analysis system.

In response to the URL links received from the malware detection appliances, according to one embodiment, the malware analysis system is configured to perform a link analysis, for example, within a dedicated analysis operating environment (e.g., a sandboxed environment or virtual machine), on the received URL links using link heuristics to determine whether the received URL link or links are likely malicious. If the malware analysis system determines that the received URL link or links are likely malicious based on the link heuristics, according to one embodiment, the malware analysis system generates one or more new malicious link signatures and distributes the new malicious link signatures back to the malware detection appliances for future local malicious link detection. Since the link analysis is performed at a dedicated malware analysis system remotely, a malware detection appliance does not have to interact with the links, which may expose the identities of the email recipients and increase workload of the malware detection appliance. Note that throughout this application, techniques have been described to detect malicious URL links within emails. However, the techniques described herein can also be applied to other types of links that may be embedded within other types of electronic documents such as word documents or portable document format (PDF) documents.

FIG. 1 is a block diagram illustrating a network system for malware detection according to one embodiment of the invention. Referring to FIG. 1, system 100 includes, but is not limited to, one or more malware detection appliances 102-103 communicatively coupled to malware analysis system 101 over network 104. Malware detection appliances 102-103 may be strategically deployed as appliances at various locations or LANs for malicious content detection. Malware detection appliances may be associated with the same or different organizations. Each of malware detection appliances 102-103 may include a malware detection system or module that can perform a static analysis or detection, a dynamic analysis or detection, or both, which may be described in details further below. Malware detection appliances 102-103 may offload at least a portion of the malware detection processes to a dedicated malware analysis system, such as malware analysis system 101. Network 104 may be any type of networks such as a local area network (LAN), a wide area network (WAN) such as the Internet, or a combination thereof According to one embodiment, any of malware detection appliances 102-103 may operate as an email malware detection (EMD) system for detecting malicious emails. For example, any of malware detection appliances 102-103 may be communicatively coupled to an email server to monitor the email traffic and perform a malicious content analysis on the emails to determine whether any of the emails are malicious emails. Whether an email should be considered as a malicious email may be determined based in part on content of the email, the attachment of the email, and/or a URL link embedded within the email. The attachment can be analyzed using the dynamic content detection techniques while the text or content of the email can be analyzed using static or heuristics content detection techniques. The combination of the static and dynamic detections on the emails may further improve the accuracy of the overall detection.

According to one embodiment, each of the malware detection appliances 102-103 includes a link extractor (e.g., link extractors 105-106) to recognize a URL link within an email and to analyze the extracted link in view of the malicious link signatures maintained locally (e.g., link signatures 107-108). Specifically, for the purpose of illustration, in response to an email received at malware detection appliance 102 for malware detection, link extractor 105 is configured to recognize a URL link within email and extract the link from the email. The URL link may be analyzed by link extractor 105 or by another analysis module (not shown) based on malicious link signatures 107 maintained locally. Link extractor 105 may match at least a portion of the URL characters against the malicious link signatures 107 to determine whether the URL link is similar or identical to the malicious links represented by malicious link signatures 107. If at least a portion of the URL link matches at least one of the malicious link signatures 107 (e.g., a domain name, uniform resource identifier or URI, or a particular character sequence or sequences), the URL link and/or the associated email may be classified as malicious and an alert may be issued to a user (e.g., administrator(s), email recipient(s)).

If link extractor 105 cannot determine whether the URL link is malicious based on malicious link signatures 107, according to one embodiment, link extractor 105 sends (e.g., via paths 121-122) the URL link to malware analysis system 101 over network 104, without sending any remaining content of the email to maintain the confidentiality of the email content. The links received from malware detection appliances 102-103 may be stored in link database 110. Malware analysis system 101 may periodically receive URL links from many malware detection appliances. The malware detection appliances may be deployed at various geographic locations and associated with different sites of the same corporate organization or different corporate organizations, while malware analysis system 101 provides malware analysis services to clients that employ the malware detection appliances.

According to one embodiment, in response to the URL links received from malware detection appliances 102-103 and stored in link database 110, link analysis module 109 is configured to perform a link analysis on each of the URL links using link heuristics 111. Link heuristics may be generated or compiled over a period of time based on the analysis of many different links. For each of links that has been determined by link analysis module 109 as a malicious link based on heuristics 111, link analysis module 109 generates a new malicious link signature as part of malicious signatures 112. Thereafter, malware analysis system 101 distributes (e.g., via paths 123-124) the new malicious link signatures to malware detection appliances 102-103 to be integrated into malicious link signatures 107-108 for subsequent local detections.

Since there may be many links received from malware detection appliances 102-103, according to one embodiment, link analysis module 109 is configured to initially apply a white list (e.g., a list of domain names that are known to be non-malicious) to screen out or filter any non-malicious links, which may reduce a number of links to be examined. For each of the remaining links, link analysis module 109 examines the link based on heuristics to determine whether the link should be considered as suspicious. This may be based on whether the link or portion thereof has one or more characteristics associated with malware at a probability satisfying a set threshold. While the probability may not be sufficient to declare the link as malicious, the probability may be sufficient to classify the link as suspicious and requiring further analysis. In one embodiment, if a URL link contains an Internet protocol (IP) address instead of a host name (e.g., http//203.x.x.x instead of http//WebSiteName.com), optionally in view of other considerations provided by link heuristics 111, the link may be considered as a possible suspicious link. For example, other heuristics may factor in the frequency of encountering a particular URL or domain name as compared with a user specified or machine set threshold. Other heuristics may also be used instead or in addition to the foregoing in finding a link "suspicious".

Once a link is considered as a suspicious or a possibly malicious link, also referred to as a malicious link suspect, according to one embodiment, link analysis module 109 is configured to access the link in an attempt to further confirm that the link is more likely a malicious link. In one embodiment, link analysis module 109 may access the link to access a remote resource specified by the URI of the link. In the above example, the file of "invoice.zip," and examines at least a portion of the resource to determine whether the resource likely contains malicious content. For example, link analysis module 109 may examine the size of the resource (e.g., whether the size of the file is unusual such as too small or too large), the type of the resource (e.g., whether it is an executable file), metadata of the resource (e.g., file header), and/or the URI itself (e.g., an unusual filename such as having double file extensions, multiple consecutive spaces in the name, etc.). Based on these characteristics of the URL links and in view of link heuristics 111, certain link suspects may be classified as malicious links.

Once a link is considered as a malicious link, link analysis module 109 generates a new malicious link signature which may be a part of malicious link signatures 112. Thereafter, link analysis module 109 distributes malicious link signatures 112 to malware detection appliances 102-103 via paths 123-124 as part of link signatures 107-108. Note that in addition to the malicious link detection, the malware detection appliances 102-103 may perform other types of malware detections. For example, a malware detection appliance may perform a dynamic content analysis on the attachment of an email or distribute the attachment to a dedicated malware analysis system for such a dynamic detection. Also note that a dedicated system (not shown) separated from malware analysis system 101 may be utilized to collect the links from malware detection appliances 102-103 and then transmit the collected links to malware analysis system 101 for link analysis.

Figure 2:
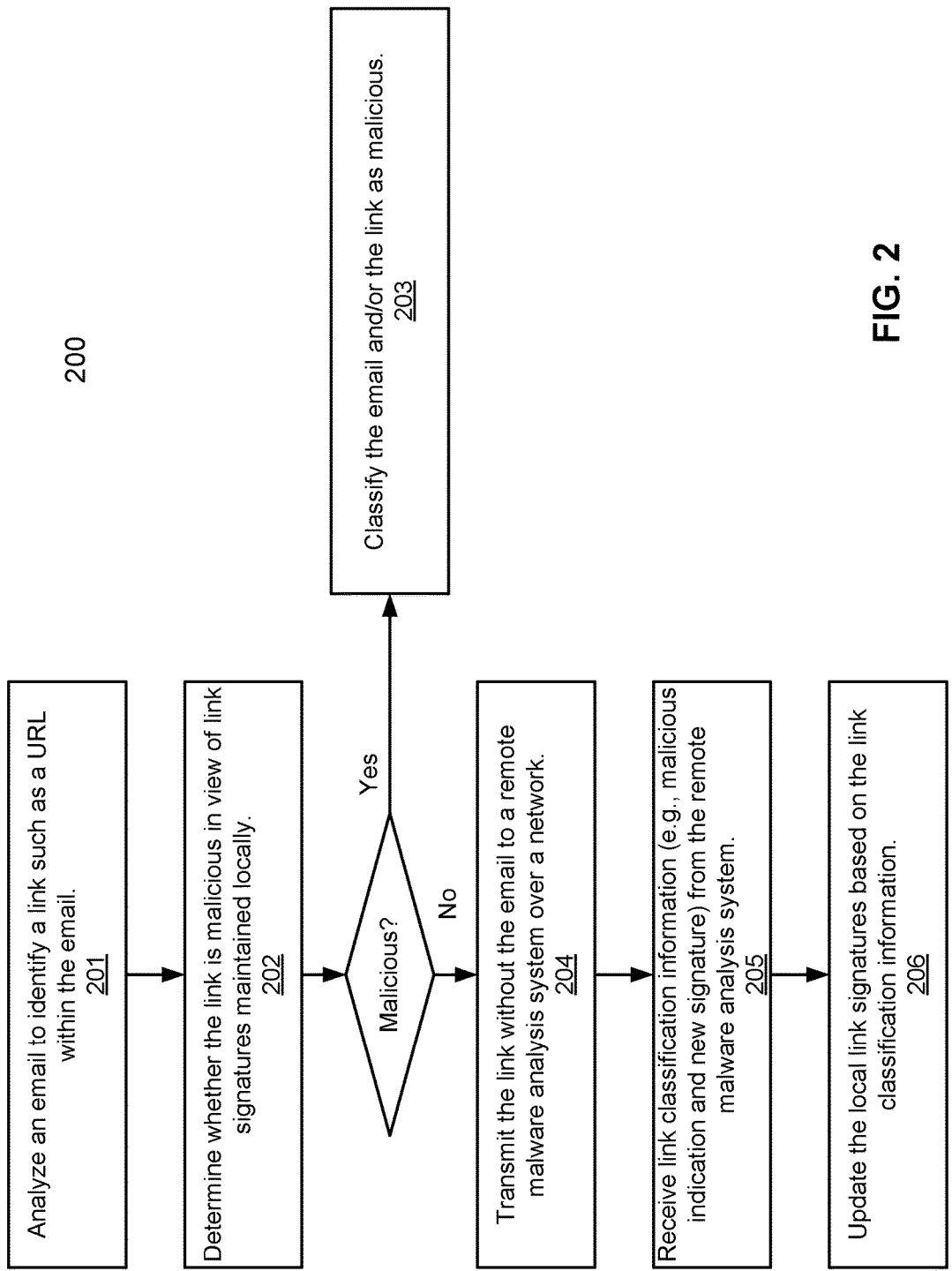
FIG. 2 is a flow diagram illustrating a method of detecting malicious links according to one embodiment of the invention.

FIG. 2 is a flow diagram illustrating a method of detecting malicious links according to one embodiment of the invention. Method 200 may be performed by processing logic which may be implemented in software, hardware, or a combination thereof. For example, method 200 may be performed by any of malware detection appliances 102-103 of FIG. 1. Referring to FIG. 2, at block 201, processing logic analyzes an email to identify a URL link within the email. At block 202, processing logic determines whether the URL link is possible malicious based on malicious link signatures maintained locally. If the URL link is considered as malicious, at block 203, the email and/or the URL link is classified as malicious and an alert may be generated to a user such as an administrator or an email recipient. If the URL link cannot be determined whether it is malicious based on the local malicious link signatures, at block 204, processing logic extracts the URL link from the email and transmits the URL link to a remote malware analysis system over a network for malicious link analysis, without transmitting the remaining content of the email. As described above, the malware analysis system is configured to perform a link analysis on the link and generate a new malicious link signature if the link is determined to be a malicious link using at least some of the techniques described above. At block 205, link classification information, such as malicious indication and/or malicious link signatures, is received from the remote malware analysis system, and at block 206, the local malicious link signatures are updated.

Figure 3:
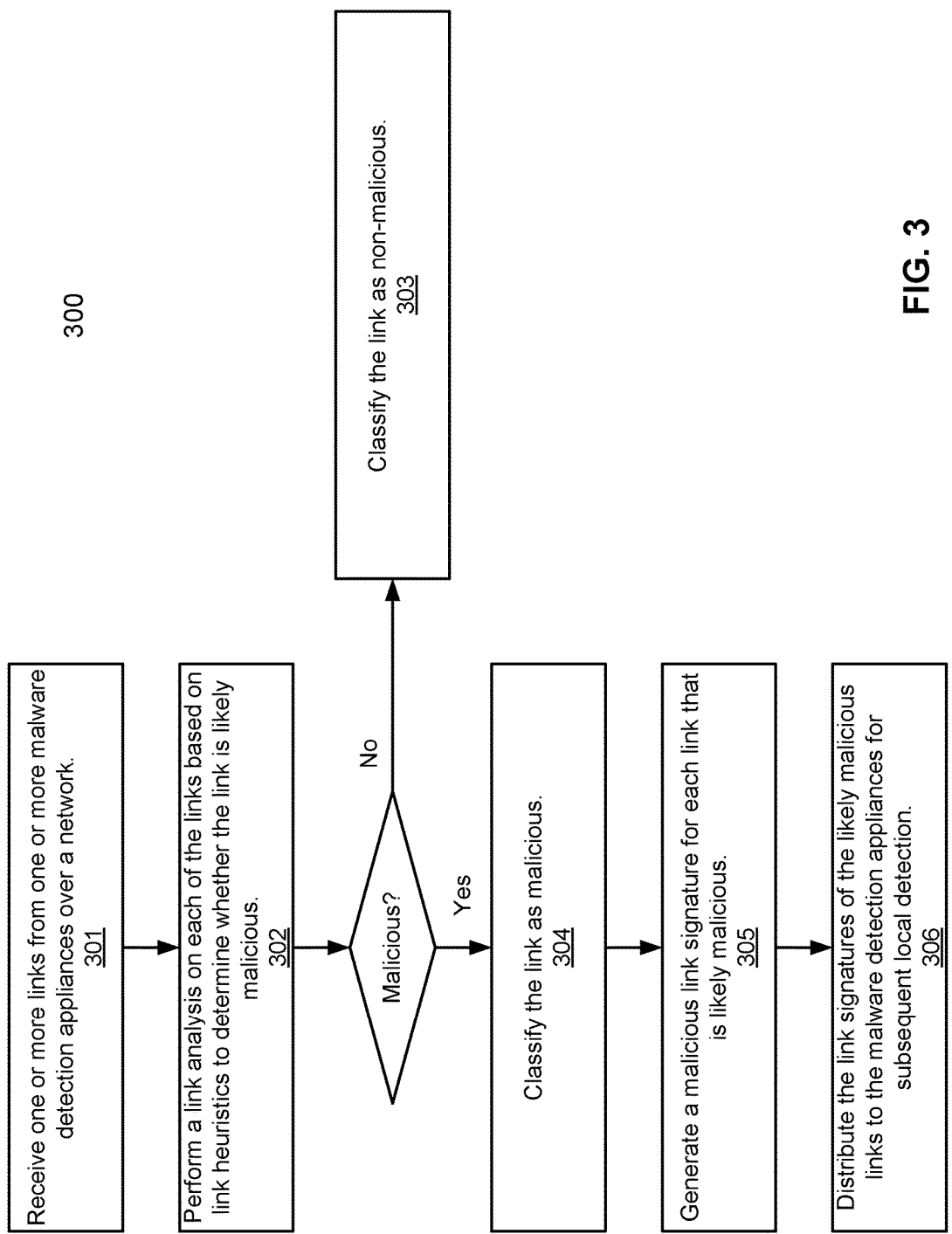
FIG. 3 is a flow diagram illustrating a method of detecting malicious links according to another embodiment of the invention.

FIG. 3 is a flow diagram illustrating a method of detecting malicious links according to another embodiment of the invention. Method 300 may be performed by processing logic which may be implemented in software, hardware, or a combination thereof. For example, method 300 may be performed by any of malware analysis system 101 of FIG. 1. Referring to FIG. 3, at block 301, processing logic receives one or more links (e.g., URL links) from one or more malware detection appliances over a network. At least one of the malware detection appliances recognizes a link within an email, extracts the link from the email, and sends the link to a malware analysis system over the network without sending the remain content of the email. At block 302, processing logic performs a link analysis on each of the links received from the malware detection appliances based on link heuristics to determine whether the link is likely malicious. If it is determined that the link is likely malicious based on the analysis, at block 303, the link is classified as a non-malicious link. Otherwise, at block 304, the link is classified as a malicious link and an alert may be issued to a user (e.g., an administrator or the email's recipient). At block 305, a new malicious link signature(s) is generated based on the newly classified malicious link and at block 306, the new malicious link signature(s) may be distributed to the malware detection appliances over the network for subsequent local malicious link detection.

Figure 4:
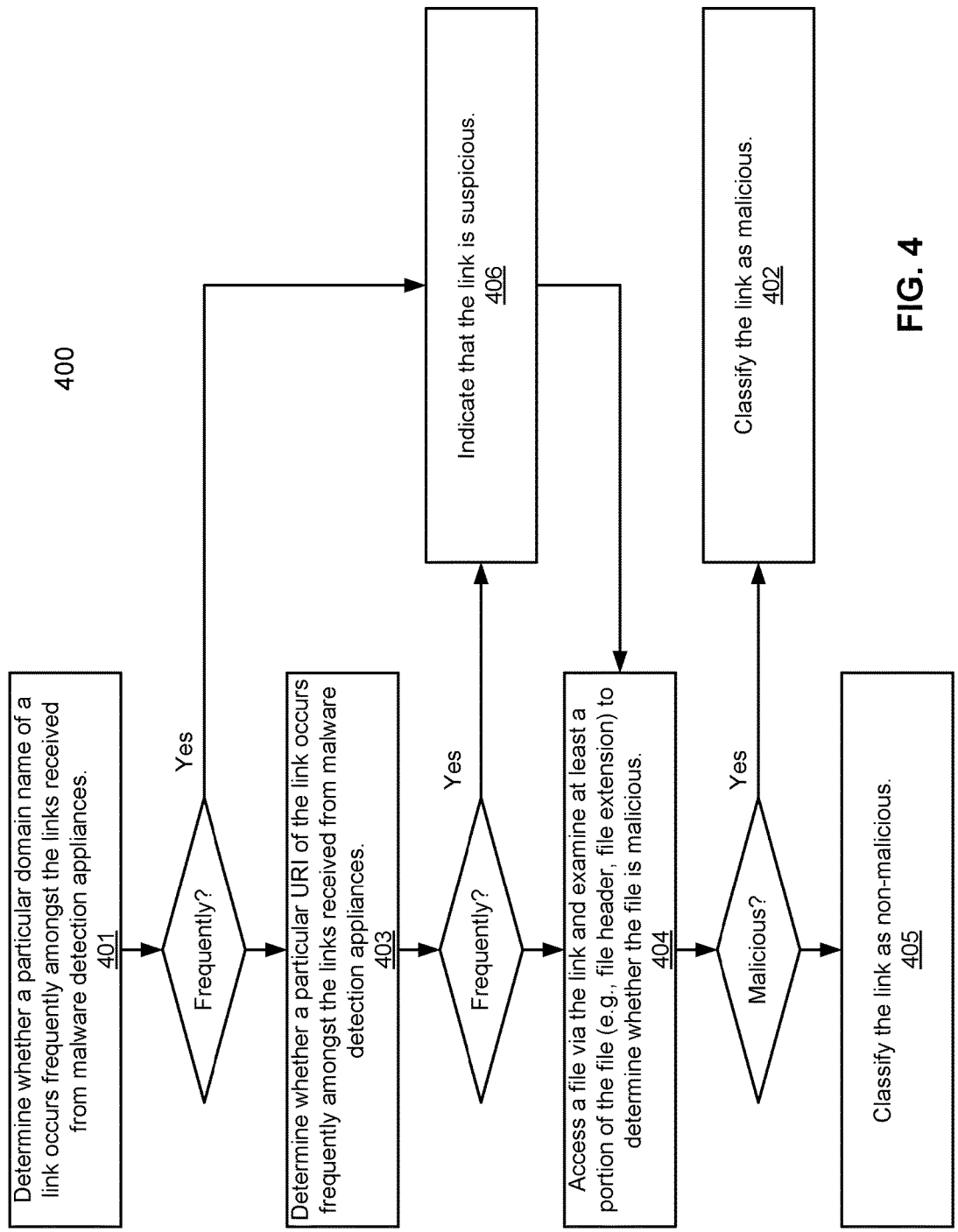
FIG. 4 is a flow diagram illustrating a method for detecting malicious links according to another embodiment of the invention.

FIG. 4 is a flow diagram illustrating a method for detecting malicious links according to another embodiment of the invention. Method 400 may be performed by processing logic which may be implemented in software, hardware, or a combination thereof. For example, method 400 may be performed as part of operations involve in block 302 of FIG. 3. Referring to FIG. 4, at block 401, processing logic determines whether a particular domain name of a link occurs frequently (e.g., above a predetermined threshold) amongst the links received from the malware detection appliances. If so, at block 406, the link or links having that particular domain name may be considered suspicious. At block 403, processing logic determines whether a particular URI of a link occurs frequently (e.g., above a predetermined threshold) amongst the links received from the malware detection appliances. If so, at block 406, the link or links having that particular URI may be considered suspicious. At block 404, processing logic accesses a file or resource via a link and examines at least a portion of the file (e.g., file header, file extension, filename, and/or file size) to determine whether the file contains malicious content. If so, at block 402, the link or links referencing that resource may be classified as malicious links. Otherwise, at block 405, the link or links may be classified as non-malicious.

The configuration as shown in FIG. 1 is described for the illustration purpose only; other configurations or settings may also be applied. For example, according to another embodiment, malware analysis system 101 may include multiple analysis systems or stations, each performing a portion of the overall URL link analysis process, in sequence or in parallel, where the analysis systems may be deployed in the cloud.

According to one embodiment, a first system performs pre-filtering using whitelists and/or blacklists to pass only specimens requiring further analysis to the second system. The blacklists and whitelists can be updated to the first system aperiodically or periodically (e.g., hourly) from a central or cloud based station. Such a pre-filtering operation can significantly screen out any URL links that are known to be either non-malicious links or malicious links.

The remaining URL links (e.g., unknown links) may then be processed by a second system. The second system is configured to perform certain link heuristic analysis as described above, for example, across multiple malware detection systems, including those of any vector type (e.g., web, email and file) as well as across multiple ones of any of these. The multiple malware detection systems which may reside at different locations within an enterprise over the cloud. For example, if the same URL is encountered widely (above a threshold count), the URL is deemed suspicious and passed to the third level. In addition, if the URLs are nearly the same but have somewhat different domain names, it may be deemed suspicious, even if the second system finds these URLs within the same enterprise or at different enterprises.

If a URL link is determined to be suspicious based on the link heuristics, the link is then transmitted to a third system for further analysis. For example, as described above, the third system determines if the URL corresponds to a "live" website and analyzes metadata for the resource at the website (e.g., the size and type of the resource, etc.). If alive and the size of the resource is larger than a predetermined threshold, but is zipped (or otherwise encoded), the zip file may also be parsed to identify anomalies in the headers in determining whether it contains malware.

Subsequent to these three levels of email malware detection systems, the content/object at the URL (now deemed to be malicious) is processed in a virtual environment provided, e.g., by a web malware detection system (e.g., a fourth system in the cloud), to verify that it is indeed malicious. Verification may require the download of the webpage at the URL. If verified, a signature may be generated and distributed to all the malware detection systems, which signature may contain the URL. Note that a malware detection system may be dedicated to web content or may also be capable of processing emails and web downloads for malware detection.

Figure 5:
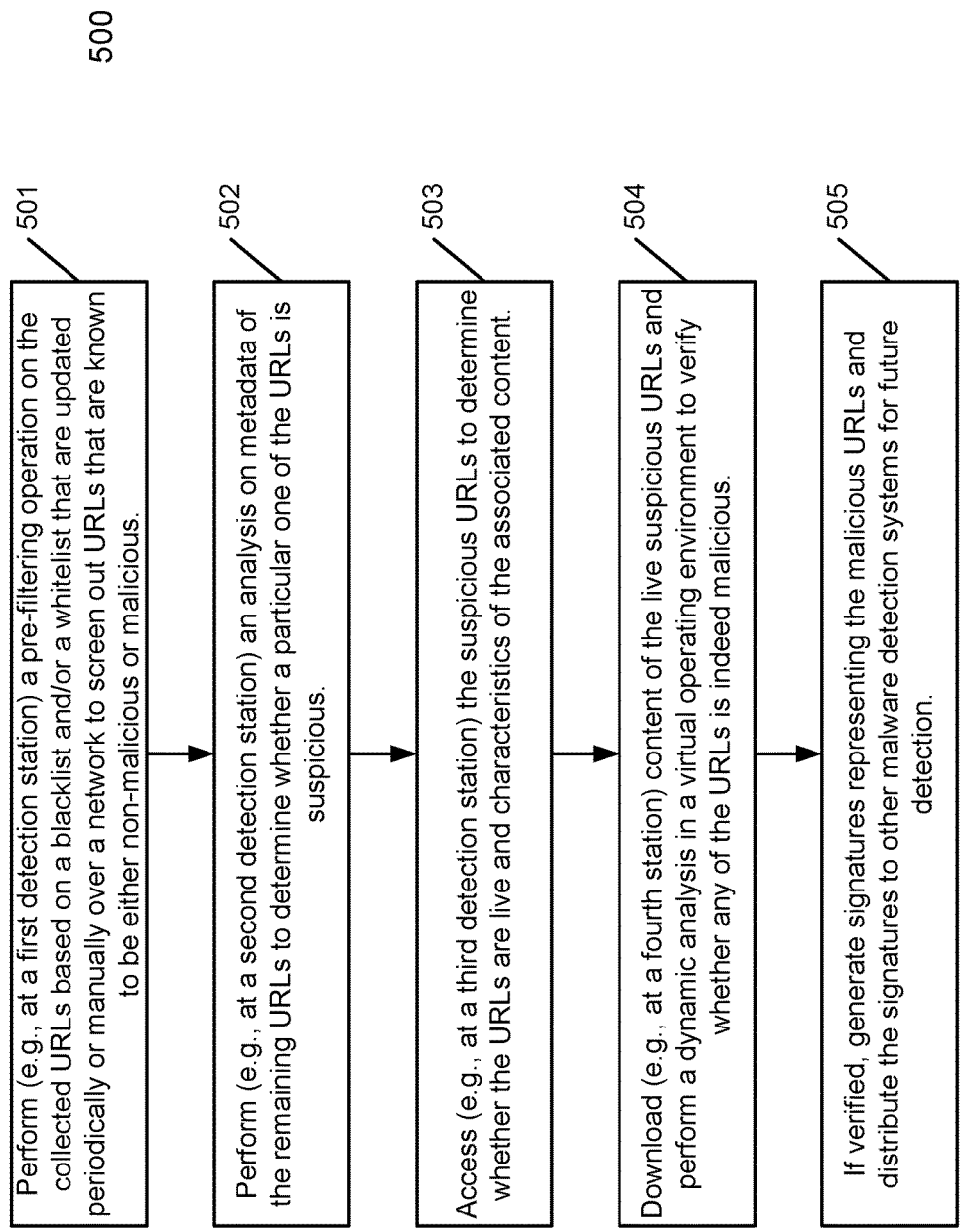
FIG. 5 is a flow diagram illustrating a method for detecting malicious links according to another embodiment of the invention.

FIG. 5 is a flow diagram illustrating a method for detecting malicious links according to another embodiment of the invention. Method 500 may be performed by processing logic which may be implemented in software, hardware, or a combination thereof. Referring to FIG. 5, at block 501, a first system performs a pre-filtering operation on the URL links that have been collected from multiple malware detection appliances, using a whitelist and/or a blacklist to screen out any known URL links (e.g., known malicious links or known non-malicious links). At block 502, the remaining URL links may be transmitted to a second system to perform a link analysis based on link heuristics to determine whether the URL links are suspicious. At block 503, the suspicious links are analyzed and accessed by a third system to determine whether the links are alive, as well as other metadata of the links (e.g., size and type of the associated resources). If a URL link is deemed to be alive, at block 504, the live link is processed at a fourth system to download the associated resource and a dynamic analysis is performed on the resource, for example, in a virtual operating environment, to verify that the URL link is indeed malicious. Thereafter, at block 505, the link signatures of the malicious links are generated and distributed to other systems. Note that some of the above operations may be merged and performed within a single system.

In an alternative embodiment, after the first system performs its pre-filtering, the activities described for the second system and third system are performed in a single malware detecting system, which determines whether the URL is malicious. Afterwards, malware verification may be performed either on the same malware detection system if equipped with a dynamic/virtual analyzer or on another system (e.g., in the cloud). In some implementations of this embodiment, some of the activity of the second system (as described in the preceding paragraph) cannot be performed, particularly those that require cross-enterprise analysis, which is normally performed remotely.

In view of the techniques described above, embodiments of the invention may use three filters: a first filter called pre-filtering; a second filter called heuristic filtering; and a third filter called object analysis. These three filters can be run in the order described above or in an overlapping/concurrent/parallel manner, though sequencing provides efficiencies. Each filter can be implemented in separate email detection systems, or combined in some fashion in a single or in two separate systems. After these three filtering steps, any detected malware is verified and reported. Verification may be performed in yet another system, a web detection system.

In a further embodiment, a single system or station may be employed. In this embodiment, a rule-based extractor within the single system is configured to extract one or more URLs from email bodies and attachments. The one or more URLs are extracted and matched against heuristic link signatures to filter the extracted ULR's to a manageable number for further analysis.

The "heuristic link signatures" used in this matching are generated through automatic and/or manual review of data collected at other network sites (e.g. beta sites) through machine learning techniques. "Machine learning" refers to a process or system that can learn from data, i.e., be trained to distinguish between malicious and non-malicious, and classify samples under test accordingly or develop indicators having a high correlation to those that are malicious. The core principals of machine learning deal with representation and generalization, that is, representation of data instances (e.g., reputation or anomaly information), and functions performed on those instances (e.g., weighting and scoring). The data used for weighting and/or scoring the likelihood of samples under test including malware may be updated from time to time, whether on an aperiodic or periodic basis. The heuristic link signatures are validated to determine what is malicious and what is not and the most popular patterns are converted into rules. For example, patterns that appear more often, i.e., greater than a predetermined threshold, in the previously determined suspicious/malicious links or non-malicious links may be converted into rules. Patterns may include certain characters or sequence of characters in a link, such as, for example, domain names or URIs, etc. These heuristic link signatures also filter out the "auto opt-in" and "auto opt-out" links contained within emails. The heuristic link signatures may be generated, for example, at a remote or central facility, coupled to the single system and possibly the other standalone malware detection systems for distribution (and updating) of the heuristic link signatures from time to time.

The heuristics represented by the heuristic link signatures may be the same as described hereinabove for the other embodiments of the invention. For example, if the frequency of encountering a link specifying a particular IP address or particular domain is above a set threshold, the heuristic may assign to the link a higher probability that the link is associated with malware, and should be classified as at least suspicious and requiring further analysis.

In the further analysis, called the "dynamic" phase, the suspicious link may be analyzed in a virtual machine to determine whether it is actually malicious. For this, the single system is provided with a network interface and network (e.g., Internet) access to permit retrieval (e.g., download) of the content of the website referenced by the URL. The system may also configure the virtual machine with one or more computer programs or applications (e.g., PDF reader or media player) suitable for the particular type or types of content (e.g., PDF document or video file, respectively) retrieved from the website. The behavior of the content within the virtual machine during execution (e.g., loading and processing of the content within an application) is monitored and unexpected or anomalous behavior (spawning processes, attempted unauthorized communications, etc.) is evaluated. Based on the behavior, the content is classified or verified as malicious or non-malicious.

In one embodiment, if an email/attachment contains a suspicious URL, the system "delays" delivery of the email for a time period up to a maximum length of time (e.g., half a minute). This may require the system to pull the email from the wire, store the email, and effectively "resend" the email if no malware is found or send an alert to the recipient that a malicious email was detected and blocked. Additionally, besides matching against heuristic link signatures, the single system is configured to apply static analysis techniques to a header or other metadata of the email message to aid in determining whether the email or its attachments are malicious. For instance, according to one embodiment of the disclosure, the email (SMTP) header is extracted and is sent to one or more static analysis modules to detect whether information within the email header is malicious or not. As an example, known malicious email headers or other metadata are analyzed to determine if the malicious content includes a pattern. The pattern is converted to a software rule, where email headers that match any of these software rules will be classified as malicious. The email rules may specify that the content of certain fields of the header (e.g., FROM, TO, or SUBJECT are associated with malware.

The above process can be implemented in real time and may use adaptable filters (updated from time to time), e.g., with changeable thresholds, may employ intelligence in the cloud to update based on experience of other malware detection systems, and/or based on machine learning or experiential techniques. On the other hand, use of dependable heuristics permits local systems to perform most processing, thus avoiding delays/latency associated with communication into the cloud, and avoid sending sensitive information "off network" into the cloud. Other configurations may also be implemented.

Figure 6:
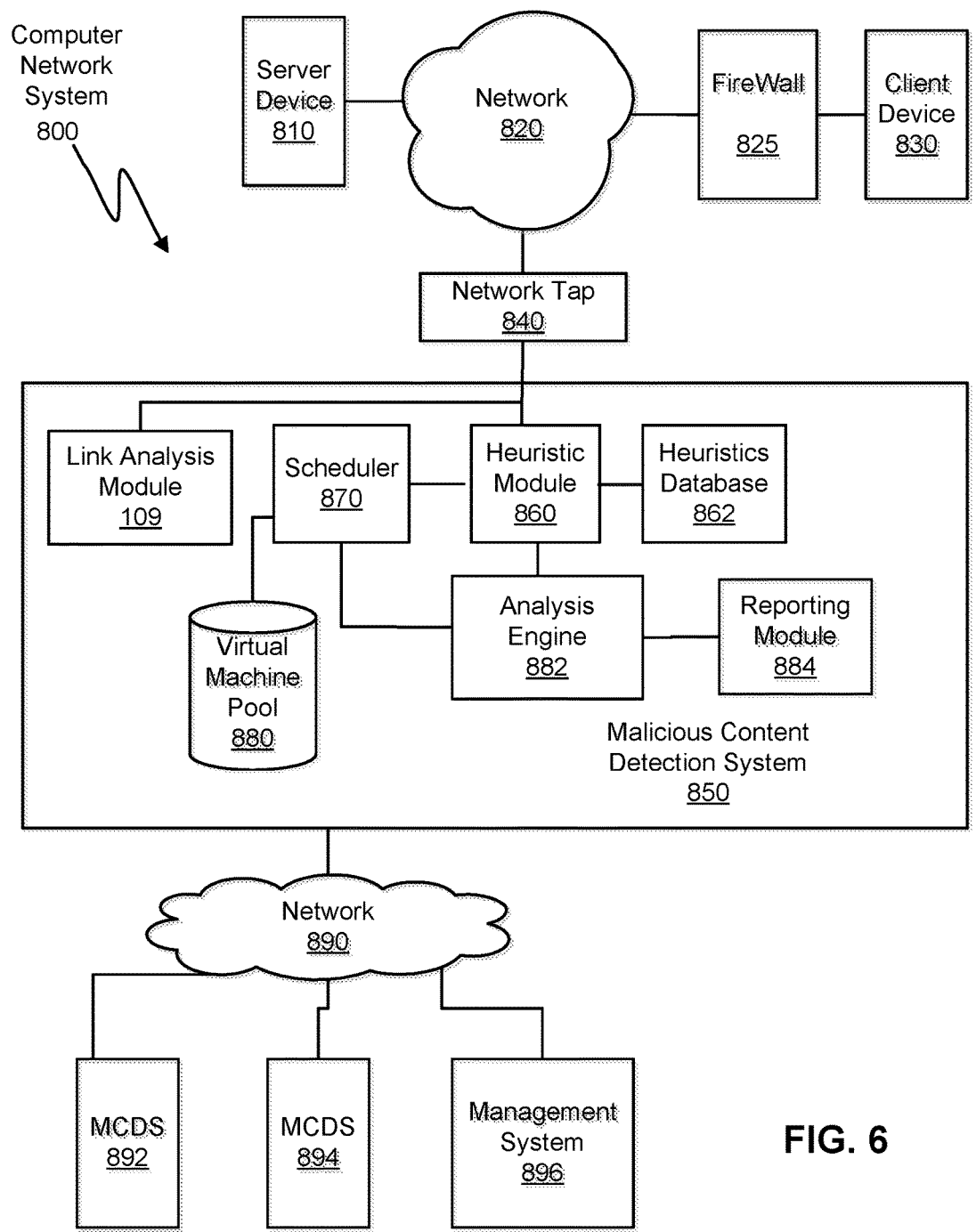
FIG. 6 is a block diagram of a computer network system deploying a malicious content detection system according to one embodiment of the invention.

FIG. 6 is a block diagram of an illustrative computer network system 800 having a malicious content detection system 850 in accordance with a further illustrative embodiment. The malicious content detection system 850 may represent any of the malicious content detection systems or malicious content analysis systems described above, such as, for example, systems 101-103 of FIG. 1. In one embodiment, the malicious content detection system 850 includes link analysis module 109 to detect and determine whether a particular URL link is malicious using some or all of the techniques described above.

The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 6 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 850 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 850 is shown as coupled with the network 820 by a network tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 840. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 850 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 860 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 882 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Figure 7:
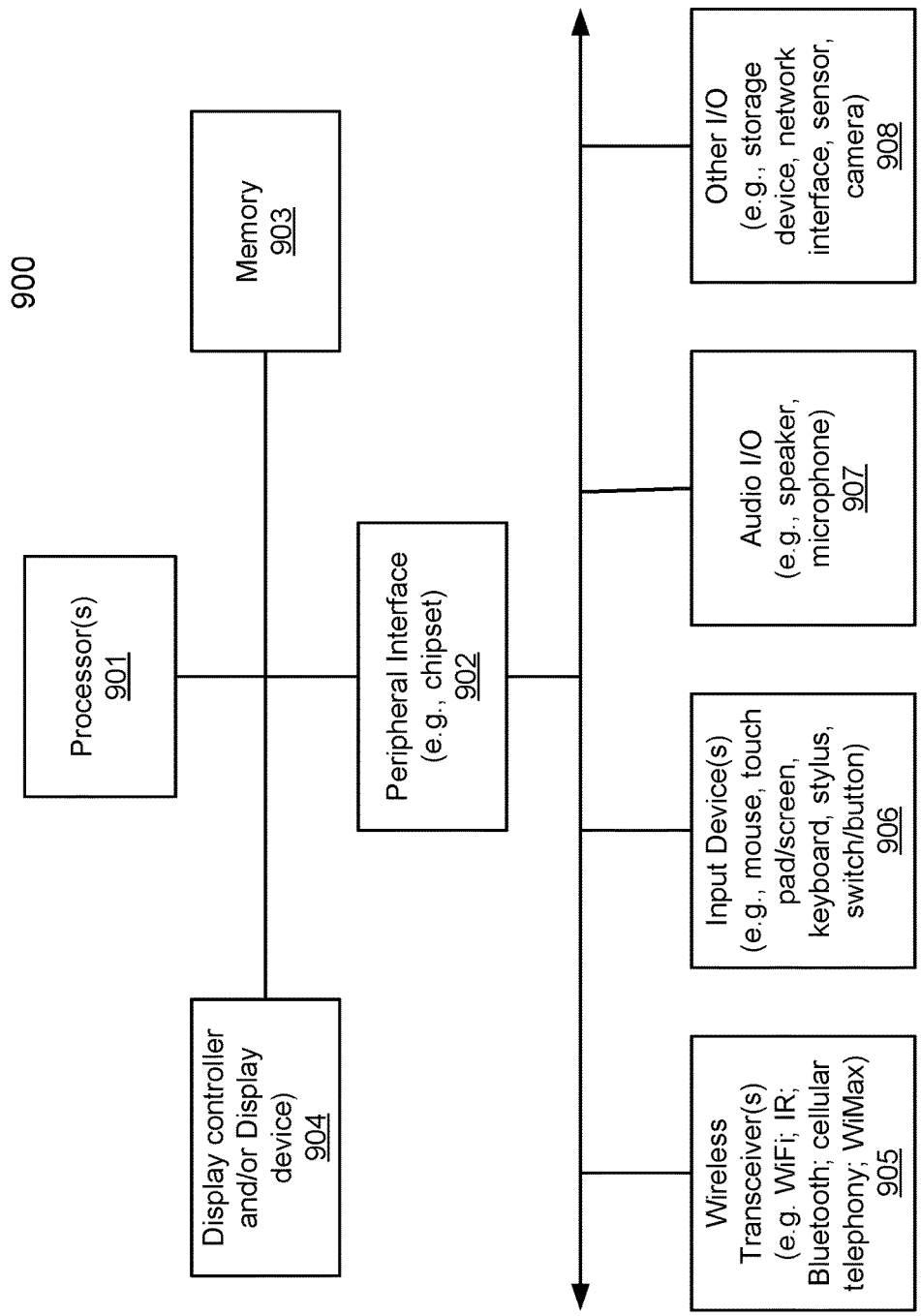
FIG. 7 is a block diagram illustrating an example of a data processing system which may be used with one embodiment of the invention.

FIG. 7 is a block diagram illustrating an example of a data processing system which may be used with one embodiment of the invention. For example, system 900 may represents any of data processing systems described above performing any of the processes or methods described above. System 900 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 7, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting malicious links in electronic messages by processing logic including circuitry implemented within a malware analysis system, comprising:
   receiving a uniform resource locator (URL) link extracted from an electronic message of the electronic messages without receiving the electronic message in its entirety, wherein the received URL link having been extracted by a malware detection appliance (i) recognizing the URL link included as part of the electronic message, (ii) extracting the URL link from the electronic message, and (iii) transmitting the URL link to the malware analysis system;
   receiving a plurality of URL links including the URL link for malicious determination by the malware analysis system, and conducting an analysis of each of the plurality of URL links to determine if any URL links of the plurality of URL links correspond to a known link signature of a plurality of known link signatures, the plurality of known link signatures including at least one or more known malicious link signatures;
   responsive to the URL link failing to correspond to any of the one or more known malicious link signatures, performing a link analysis using link heuristics by the malware analysis system on the URL link to determine whether the URL link is suspicious, the link heuristics include one or more heuristic link signatures generated over time based on results of analyses of prior URL links;
   responsive to determining the URL link is suspicious, performing an analysis on a resource specified by a portion of the suspicious URL link and classifying whether the suspicious URL link is a malicious link based on the analysis of the resource; and
   returning a link signature associated with the URL link to the malware detection appliance when the URL link constitutes a malicious link, the link signature to be integrated into locally stored malicious link signatures of the malware detection appliance for subsequent local detection of malicious URL links at the malware detection appliance.

2. The method of claim 1, wherein the malware detection appliance is one of a plurality of malware detection systems connected over a network to the system and provides the received URL link.

3. The method of claim 1, wherein the performing of the link analysis comprises:
   determining a first domain name included in the URL link;
   determining whether a number of occurrences of the first domain name in the plurality of URL links that include the URL link exceeds a predetermined threshold; and
   designating the URL link and any other URL link of the plurality of URL links that include the first domain name as suspicious when the number of occurrences of the first domain name in the plurality of URL links exceeds the predetermined threshold.

4. The method of claim 1, wherein the performing of the link analysis comprises:
   determining whether a number of occurrences of a first uniform resource identifier (URI) in the plurality of URL links exceeds a predetermined threshold, the plurality of URL links include the URL link received from the malicious detection appliance; and
   designating the URL link and any other URL link of the plurality of links including the first URI as suspicious when the number of occurrences of the first URI in the plurality of URL links exceeds the predetermined threshold.

5. The method of claim 1, wherein the performing of the link heuristics comprises determining whether a pattern of characters is present in the URL link, and if so, determining that the URL link is suspicious.

6. The method of claim 1, wherein the performing of the link analysis includes an examination of whether the URL link includes an Internet protocol (IP) address instead of a host name.

7. The method of claim 1, wherein prior to receiving the URL link, the method further comprising:
receiving the electronic messages including the plurality of URL links by the malware detection appliance;
extracting the URL link by the malware detection appliance; and
comparing the URL link with a second plurality of known link signatures stored locally by the malware detection appliance.

8. The method of claim 1, wherein the performing of the analysis on the resource comprises accessing the resource as specified by a uniform resource identifier (URI) of the URL link and examining metadata of the resource including at least a size of the resource to determine whether the size is smaller or larger than an expected size.

9. The method of claim 1, wherein prior to receiving the URL link, the method further comprising:
communicatively coupling the malware analysis system to one or more malware detection appliances over a network.

10. The method of claim 1, wherein the malware detection appliance includes a software module that is configured to perform a static analysis, a dynamic analysis or both the static analysis and the dynamic analysis of content within the electronic message.

11. The method of claim 1, wherein the malware detection appliance is operating within a cloud.

12. The method of claim 1, wherein the plurality of known link signatures further include at least one or more known benign link signatures.

13. The method of claim 1, wherein the analysis performed on the resource comprises monitoring behaviors of the content within a virtual machine during execution and at least evaluating unexpected or anomalous behavior.

14. The method of claim 1, wherein the analysis further comprises analysis of text or content of the electronic message being conducted using static or heuristics content detection techniques.

15. The method of claim 1, wherein the recognizing of the URL link included as part of the electronic message comprises recognizing the URL link is embedded within the electronic message.

16. The method of claim 1, wherein the recognizing of the URL link included as part of the electronic message comprises recognizing the URL link is included within an attachment to the electronic message.

17. A malware analysis system comprising:
a memory; and
a processor coupled to the memory, the processor to (i) receive a uniform resource locator (URL) link extracted from an electronic message without receiving the electronic message in its entirety, wherein the received URL link being extracted by a malware detection appliance by at least recognizing the URL link included as part of the electronic message, extracting the URL link from the electronic message, and providing the URL link to the malware analysis system; (ii) conduct an analysis of the URL link to determine whether the URL link of a plurality of URL links received by the system corresponds to a known link signature of a plurality of link signatures, the plurality of known link signatures including at least one or more known malicious link signatures; (iii) responsive to the URL link failing to correspond to any of the one or more known malicious link signatures, perform a link analysis on the URL link using link heuristics to determine whether the URL link is suspicious, the link heuristics including one or more heuristic link signatures generated over time based on results of analyses of prior URL links; (iv) responsive to determining the URL link is suspicious, perform an analysis on a resource specified by a portion of the suspicious URL link and classify whether the suspicious URL link is a malicious link based on the analysis of the resource; and return a link signature associated with the URL link to the malware detection appliance when the URL link constitutes a malicious link, the link signature to be integrated into locally stored malicious link signatures of the malware detection appliance for subsequent local detection of malicious URL links at the malware detection appliance.

18. The system of claim 17, wherein the processor to perform the link analysis by
determining a domain name included in the URL link;
determining whether a number of occurrences of the domain name in the plurality of the plurality of URL links that includes the URL link exceeds a predetermined threshold; and
designating the URL link and any other URL link of the plurality of URL links as suspicious when the number of occurrences of the domain name in the plurality of URL links exceeds the predetermined threshold.

19. The system of claim 17, wherein the processor to perform the link analysis by
determining whether a number of occurrences of a first uniform resource identifier (URI) in the plurality of URL links exceeds a predetermined threshold, the plurality of URL links include the URL link received from the malicious detection appliance; and
designating the URL link and any other URL link of the plurality of URL links that includes the first URI as suspicious when the number of occurrences of the first URI in the plurality of URL links exceeds the predetermined threshold.

20. The system of claim 17, wherein the processor to perform the link heuristics by at least determining whether a pattern of characters is present in the URL link, and if so, determining that the URL link is suspicious.

21. The system of claim 17, wherein the processor to perform the link analysis by at least conducting an analysis as to whether the URL link includes an Internet protocol (IP) address instead of a host name.

22. The system of claim 17, wherein the processor to perform the analysis on the resource by at least accessing the resource as specified by a uniform resource identifier (URI) of the URL link and examining metadata of the resource including at least a size of the resource to determine whether the size is smaller or larger than an expected size.

23. The system of claim 17, wherein the processor to perform the analysis on the resource that includes conducting a dynamic analysis on the resource being content received from a server based on the portion of the suspicious URL link and processing the resource in a virtual operating environment including one or more virtual machines to verify that the URL link is malicious.

24. The system of claim 17 being communicatively coupled to the malware detection appliance, the malware detection appliance includes a software module that is configured to perform a static analysis, a dynamic analysis or both the static analysis and the dynamic analysis of content within the electronic message.

25. The system of claim 17 being communicatively coupled to the malware detection appliance, the malware detection appliance operating within a cloud.

26. The system of claim 17, wherein the plurality of known link signatures further include at least one or more known benign link signatures.

27. The system of claim 17, wherein the processor to further conduct an analysis of text or content of the electronic message being conducted using static or heuristics content detection techniques.

28. The system of claim 17, wherein the URL link is recognized as being included as part of the electronic message by at least recognizing the URL link is embedded within the electronic message.

29. The system of claim 17, wherein the URL link is recognized as being included as part of the electronic message by at least recognizing the URL link is included within an attachment to the electronic message.

30. A non-transitory machine-readable medium having instructions stored therein, which when executed by a processor within a malware analysis system, cause the processor to perform operations for detecting malicious links in electronic messages, comprising:
   receiving a uniform resource locator (URL) link extracted from an electronic message of the electronic messages without receiving the electronic message in its entirety, wherein the received URL link having been extracted by a malware detection appliance (i) recognizing the URL link is included as part of the electronic message, (ii) extracting the URL link from the electronic message, and (iii) transmitting the URL link to the malware analysis system;
   receiving a plurality of URL links including the URL link for malicious determination and conducting an analysis of each of the plurality of URL links to determine if any URL links of the plurality of URL links correspond to a known link signature of a plurality of known link signatures, the plurality of known link signatures including at least one or more known malicious link signatures;
   responsive the URL link failing to correspond to any of the one or more known malicious link signatures, performing a link analysis using link heuristics on the URL link to determine whether the URL link is suspicious, the link heuristics include one or more known heuristic link signatures generated over time based on results of analyses of prior URL links;
   responsive to determining the URL link is suspicious, performing an analysis on a resource specified by a portion of the suspicious URL link and classifying whether the suspicious URL link is a malicious link based on the analysis of the resource; and
   returning a link signature associated with the URL link to the malware detection appliance when the URL link constitutes a malicious link, the link signature to be integrated into locally stored malicious link signatures of the malware detection appliance for subsequent local detection of malicious URL links at the malware detection appliance.

31. The medium of claim 30, wherein the malware detection appliance corresponds to one of a plurality of malware detection systems connected over a network to the system and provides the received URL link.

32. The medium of claim 30, wherein the performing of the link analysis being operations performed by the processor comprises:
   determining a first domain name included in the URL link;
   determining whether a number of occurrences of the first domain name in the plurality of URL links that includes the URL link exceeds a predetermined threshold; and
   designating the URL link and any other URL link of the plurality of URL links that include the first domain name as suspicious when the number of occurrences of the first domain name in the plurality of URL links exceeds the predetermined threshold.

33. The medium of claim 30, wherein the performing of the link analysis comprises:
   determining whether a number of occurrences of a first uniform resource identifier (URI) in the plurality of URL links exceeds a predetermined threshold, the plurality of URL links include the URL link received from the malicious detection appliance; and
   designating the URL link and any other URL link of the plurality of links including the first URI as suspicious when the number of occurrences of the first URI in the plurality of URL links exceeds the predetermined threshold.

34. The medium of claim 30, wherein the performing of the link heuristics being operations performed by the processor comprises determining whether a pattern of characters is present in the URL link, and if so, determining that the URL link is suspicious.

35. The medium of claim 30, wherein the plurality of known link signatures further include at least one or more known benign link signatures.

36. The medium of claim 30, wherein the malware detection appliance includes a software module that is configured to perform a static analysis, a dynamic analysis or both the static analysis and the dynamic analysis of content within the electronic message.

37. The medium of claim 30, wherein the malware detection appliance operating within a cloud.

38. The medium of claim 30, wherein the stored instructions, when executed by the processor, cause the processor to perform the analysis on the resource by at least monitoring behaviors of the content within a virtual machine during execution and at least evaluating unexpected or anomalous behavior.

39. The medium of claim 30, wherein the stored instructions, when executed by the processor, cause the processor to further conduct an analysis of text or content of the electronic message using static or heuristics content detection techniques.

40. The medium of claim 30, wherein the URL link is recognized as being included as part of the electronic message by at least recognizing the URL link is embedded within the electronic message.

41. The medium of claim 30, wherein the URL link is recognized as being included as part of the electronic message by at least recognizing the URL link is included within an attachment to the electronic message.

* * * * *